Figure 1:
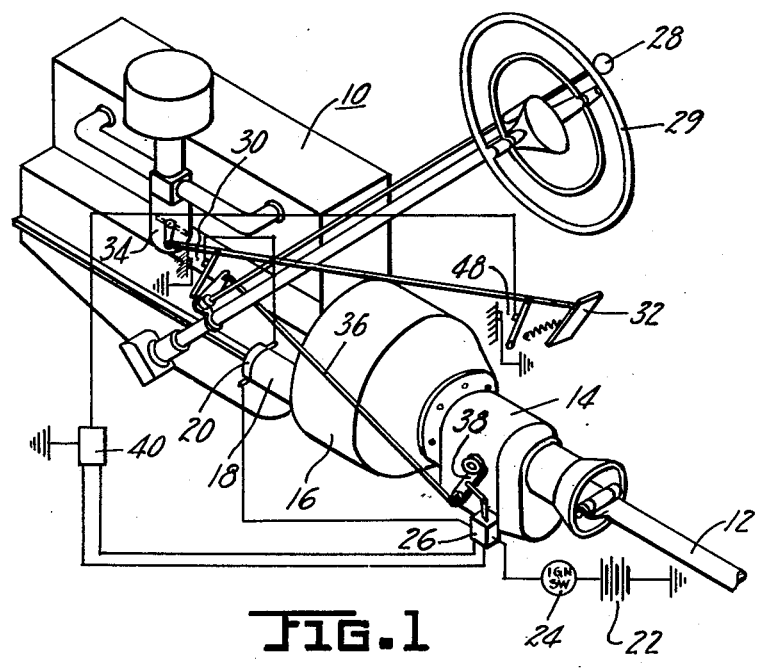

June 18, 1957  R. H. LONG  2,796,059

SWITCH CONTROL MECHANISM

Filed Sept. 17, 1954

INVENTOR.
RICHARD H. LONG
BY
H. O. Clayton
ATTORNEY

United States Patent Office 2,796,059
Patented June 18, 1957

2,796,059

SWITCH CONTROL MECHANISM

Richard H. Long, South Bend, Ind., assignor to Bendix Aviation Corporation, South Bend, Ind., a corporation of Delaware Application September 17, 1954, Serial No. 456,716

7 Claims. (Cl. 123—179)

This invention relates in general to a mechanism for starting the internal combustion engine of an automotive vehicle and more particularly to a mechanism for restarting said engine following its failure to operate due to malfunction thereof.

Vehicles equipped with automatic transmissions or fluid couplings have a tendency to stall if the accelerator is opened momentarily and then closed shortly thereafter, this operation being probably due to a so-called loading up of the carburetor. With such a stall a restarting of the engine requires returning the selector lever of the transmission to its neutral position followed by an operation of the starter switch. As to this selector lever operation it is assumed that the driver usually actuates said lever, to prepare the transmission for a movement of the vehicle, immediately after the engine is started. The aforementioned operations, necessary to recrank the engine, are indeed unhandy; particularly under the stress of possibly blocking traffic. Accordingly the present invention has to do with the provision of means for restarting the engine of an automotive vehicle after the engine has stalled with the transmission set for a motion of the vehicle; and the principal virtue of this mechanism lies in the simplicity of its operation to effect this result, there being no operation of the hands of the driver and but one operation of the foot, that is an operation of an accelerator operated starter motor switch.

Yet another object of my invention is to provide, in an automotive vehicle provided with a transmission having a neutral setting and a plurality of other settings to effect either a forward or backward movement of the vehicle, a relatively simple electrical mechanism for controlling the starter solenoid of the mechanism for starting an internal combustion engine of said vehicle, said electrical mechanism serving, with but a single operation by the driver, to restart the engine after the same has been stalled.

A further object of my invention is to provide, in an automotive vehicle including a manually operated control for the transmission of the vehicle, an accelerator operated starter switch and an engine starter mechanism normally operative when the transmission is in neutral, an electrical mechanism operative, with but a closing of the engine starter switch, to energize the engine starter mechanism of the vehicle and thereby recrank the engine after the latter has been stalled with the transmission established in a setting other than neutral.

Although only one embodiment of the invention has been illustrated and described, various changes in the form and relative arrangements of the parts may be made to suit requirements.

Figure 2:
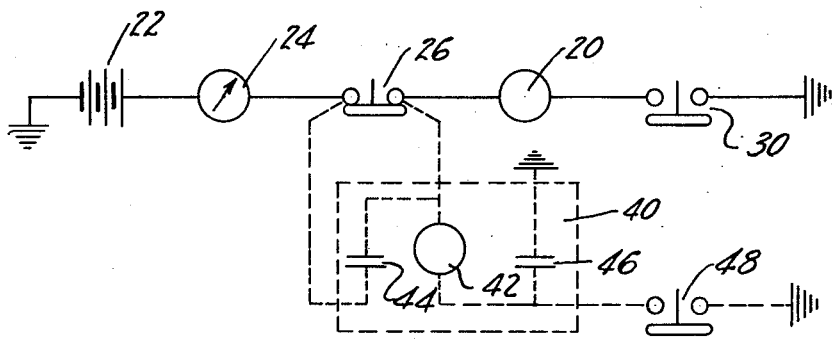

Figure 1 is a view disclosing the internal combustion engine of an automotive vehicle and the mechanism of my invention for restarting said engine after the same has been stalled with the transmission of the vehicle established in a setting other than neutral; and Figure 2 is a view disclosing the electrical hookup of the engine restarter mechanism of Figure 1.

There is disclosed in the two figures of the drawing a preferred embodiment of my invention. Referring to Figure 1 an internal combustion engine 10 of an automotive vehicle is drivably connected to a propeller shaft 12 of said vehicle by means including a transmission mechanism 14 which may be of the automatic type; and this transmission cooperates with means including a fluid coupling 16 in providing the desired driving connection between the engine and the propeller shaft. The engine 10 is started by mechanism including a starter motor 18 upon the casing of which is mounted a starter solenoid 20. Energization of the solenoid 20 results in an operation of the motor 18 to crank the engine. This mechanism is well known to those skilled in this art accordingly the same is not disclosed in detail.

My invention has to do with energizing the solenoid 20 to initiate the operation of restarting of the engine after the same has been stopped, the transmission 14 at the time being established in a setting to effect either a forward or backward movement of the vehicle; in other words any setting of the transmission except neutral. As stated in the objects of my invention vehicles equipped with automatic transmissions or fluid couplings have a tendency to stall if the accelerator is opened momentarily and then closed shortly thereafter; and of course this may also happen if the transmission cooperating with my invention is of the selective gear type such as a three speeds forward and reverse transmission. The latter type of transmission usually cooperates with a manually or power operated clutch operating mechanism incorporated in the power plant between the engine and the transmission.

Now preliminary to cranking the engine the driver will, of course, place the transmission in its neutral setting and close the ignition switch indicated by the reference numeral 24 in Figure 2; and having done this he will then operate the engine starter mechanism to crank the engine. He will then, assuming he desires the car to move forwardly, actuate the transmission operating mechanism, say a shift lever 28 mounted adjacent a steering wheel 29, to establish the transmission in a setting to make possible the desired forward motion of the car. However after the transmission has been established in this forward setting the engine may stall when the accelerator is released either all or part way; and this may happen before the car starts running or shortly thereafter; say when driving through a street intersection.

Should this happen it would then be necessary for the driver of the car to reestablish the transmission in its neutral setting prior to again cranking the engine; for it is to be remembered that the aforementioned engine starter mechanism includes the switch 26 which is closed only when the transmission is established in its neutral setting. However with my invention the operation of reestablishing the transmission in neutral is unnecessary it being merely necessary to again actuate the accelerator operated starter switch to recrank the engine.

Referring now to the drawing for a detailed description of the preferred embodiment of my invention the aforementioned starter solenoid 20 is electrically connected in series with a grounded battery 22, the ignition switch 24 of the car, a normally open switch 26 which is closed when the transmission operating shift lever 28 is placed in its transmission neutral setting, and grounded accelerator operated starter switch 30 of any well known design such as that of the so-called vacuum interlocked type. Such a switch, no claim to which is made, will be automatically opened by power means after the same is closed by a depression of the accelerator; and despite the driver continuing to hold the accelerator depressed sufficiently to close said switch. The accelerator 32 of the car is disclosed in Figure 1 said accelerator serving to operate a carburetor 34 of any well known design. The shift lever 28 is connected to the transmission by a linkage 36 including a crank 38 for operating the switch 26.

Describing now the most important feature of my invention there is provided means, by-passing the switch 26, for closing the electrical circuit between the starter solenoid 20 and the battery 22 when the accelerator has been depressed in its operation of closing the starter switch 30. This mechanism preferably includes a so-called hold down relay 40 comprising a coil 42, a normally open switch 44 electrically connected in series with the battery, ignition switch and starter solenoid, and a normally open grounded switch 46. As is disclosed in Figure 2 the coil 42 is electrically connected in series with the battery, ignition switch, transmission operating switch 26 and a normally open grounded accelerator operated switch 48 which is preferably closed when the accelerator is depressed to say its three-fourth throttle open position but short of a position to close the switch 30. The grounded relay switch 46 is connected in series with the battery, ignition switch, switch 26 and coil.

Briefly describing the operation of the starter mechanism of my invention, to start the engine the driver will close the ignition switch 24 and actuate the shifter lever 28 to place the transmission in neutral thereby closing the switch 26. The accelerator is then depressed sufficiently to close the switches 30 and 48; and the closing of the switch 30 results in a cranking of the engine. Then the driver will either immediately before, concurrently with or immediately after he releases the accelerator, actuate the shift lever to establish the transmission in a setting preparatory to effecting a motion of the vehicle said operation opening the switch 26; and to get the vehicle under way the driver will then again depress the accelerator to operate the engine throttle. With my invention, should the engine stall after the transmission has been established in the latter position and immediately after the accelerator has been released sufficiently to open the switches 48 and 30, the driver, to recrank the engine, need but to again depress the accelerator sufficiently to again close the switch 30; for when the accelerator was originally depressed to crank the engine the switch 48 was closed thereby energizing the relay 40; and with this operation, by virtue of the operation of the grounded switch 46, there was provided a circuit from the grounded switch 46 to the grounded battery 22 and a supplemental or by-pass circuit around the switch 26 said circuit including the battery, solenoid and switch 30. It follows therefore that the aforementioned closing of the switch 30 will result in a re-energization of the solenoid 20 to effect, through the operation of the motor 18, a recranking of the engine.

There is thus provided by my invention, an engine starter mechanism operative, with but a depression of the accelerator, to effect a quick recranking of the engine should the same stall after the transmission has been established in a position to effect a movement of the vehicle. My invention has another feature in that turning the ignition switch 24 off will cause the hold down relay 40 to release thereby making it necessary to place the transmission controlling shift lever 28 in its neutral position to operate the starter solenoid. This provides a safety feature, in that each first time the engine is started after being turned off by the ignition requires returning the transmission selector lever 28 to its neutral position.

I claim:

1. In an automotive vehicle provided with an accelerator, an internal combustion engine and a transmission mechanism and controls therefor including a manually operable member movable to one position to establish the transmission in its neutral setting and in another position to establish the transmission in a setting to facilitate a bodily movement of the vehicle; means for cranking the engine including electrical means comprising a switch which is closed when the transmission is established in its neutral setting; and means, including a switch actuated by the accelerator, supplementing the aforementioned means and cooperating with a part thereof, and operative, after the engine has stalled, to effect a recranking of the engine after the transmission has been established in the setting to facilitate a bodily movement of the vehicle.

2. In an automotive vehicle provided with an accelerator, an internal combustion engine and a transmission mechanism and control therefor including a manually operable member movable to one position to establish the transmission in its neutral setting and in another position to establish the transmission in a setting to facilitate a bodily movement of the vehicle; means for cranking the engine including electrical means comprising a switch which is closed when the transmission is established in its neutral setting and a switch which is closed when the accelerator is depressed a certain amount; and means, including another switch actuated by the accelerator, supplementing the aforementioned means and cooperating with a part thereof, and operative, after the engine has stalled, to effect a recranking of the engine after the transmission has been established in the setting to facilitate a bodily movement of the vehicle.

3. In an automotive vehicle provided with an accelerator, an engine, and a transmission; electrical means, including an accelerator operated switch, for cranking the engine when the accelerator is depressed a certain amount, the transmission at the time being established in its neutral setting; and other electrical means, including an accelerator operated switch, operative to cooperate with a large part of the aforementioned electrical means in effecting a recranking of the engine after the latter has been stalled, the transmission at the time of said stalling being established in any setting other than its neutral setting.

4. In an automotive vehicle provided with an accelerator, an internal combustion engine, and a transmission; means for cranking the engine when the transmission is established in either its neutral setting or a setting to effect a bodily motion of the vehicle, said means including electrical means comprising, in series, a source of electricity, a normally open switch which is closed when the transmission is established in its neutral setting, a starter solenoid and an accelerator operated switch; and further including other electrical means cooperating with the aforementioned electrical means and parts of the cranking means and operative, together with a large part of the first mentioned electrical means, to effect an engine recranking operation of the cranking means when the transmission is established in a setting to effect a bodily movement of the vehicle.

5. In an automotive vehicle provided with an accelerator, an internal combustion engine, and a transmission; means for cranking the engine when the transmission is established in either its neutral setting or a setting to effect a bodily motion of the vehicle, said means including electrical means comprising, in series, a source of electricity, a normally open switch which is closed when the transmission is established in its neutral setting, a starter solenoid and an accelerator operated switch; and further including other electrical means, cooperating with the aforementioned electrical means and parts of the cranking means, and operative, together with a large part of the first mentioned electrical means, to effect an engine recranking operation of the cranking means when the transmission is established in a setting to effect a bodily movement of the vehicle, said other electrical means including a hold down relay mechanism and an accelerator operated switch for controlling the operation of said relay.

6. In an automotive vehicle provided with an accelerator, an internal combustion engine, and a transmission; means for cranking the engine when the transmission is established in either its neutral setting or a setting to effect a bodily motion of the vehicle, said means including electrical means comprising, in series, a source of electricity, a normally open switch which is closed when the transmission is established in its neutral setting, a starter solenoid and an accelerator operated switch; and further including other electrical means cooperating with the aforementioned electrical means and parts of the cranking means and operative, together with a large part of the first mentioned electrical means, to effect an engine re-cranking operation of the cranking means when the transmission is established in a setting to effect bodily movement of the vehicle, said other electrical means including electrical conductor means comprising a normally open switch, and further including means for closing said switch.

7. In an automotive vehicle provided with an accelerator, an ignition switch, an internal combustion engine, and a transmission; means for cranking the engine when the transmission is established in either its neutral setting or a setting to effect a bodily motion of the vehicle, said means including electrical means comprising, in series, a source of electricity, a normally open switch which is closed when the transmission is established in its neutral setting, a starter solenoid and an accelerator operated switch; and further including other electrical means for by-passing the transmission operated switch of the aforementioned electrical means said other electrical means including a relay mechanism comprising a coil and a normally open switch, electrical conductor means interconnecting the latter switch with the ignition switch, electrical conductor means interconnecting the normally open switch with the starter solenoid, a grounded accelerator operated switch electrically connected to the relay coil, and a grounded normally open switch also electrically connected to said coil.

References Cited in the file of this patent

UNITED STATES PATENTS

| | | |
|---|---|---|
| 2,437,023 | Gilbert | Mar. 2, 1948 |
| 2,593,933 | Strawn | Apr. 22, 1952 |
| 2,661,730 | Schneider et al. | Dec. 8, 1953 |
| 2,685,873 | Cooke | Aug. 10, 1954 |